United States Patent [19]

Sasaki et al.

[11] Patent Number: 5,713,531
[45] Date of Patent: Feb. 3, 1998

[54] BASE PLATE ASSEMBLY FOR TAPE CASSETTE FOR INCREASING CORROSION RESISTANCE

[75] Inventors: Kazuo Sasaki; Shuichi Kikuchi, both of Miyagi, Japan

[73] Assignee: Sony Corporation, Tokyo, Japan

[21] Appl. No.: 662,493

[22] Filed: Jun. 13, 1996

[30] Foreign Application Priority Data

Jun. 14, 1995 [JP] Japan .................................... 7-146654

[51] Int. Cl.$^6$ .................................................. G11B 23/08
[52] U.S. Cl. .............................................. 242/347; 360/132
[58] Field of Search ............................. 242/347; 360/132

[56] References Cited

U.S. PATENT DOCUMENTS

| | | | |
|---|---|---|---|
| 4,949,210 | 8/1990 | Satoh et al. | 360/132 |
| 5,468,065 | 11/1995 | Ishikawa | 242/347 X |
| 5,541,797 | 7/1996 | Ping et al. | 360/132 |

*Primary Examiner*—John M. Jillions
*Assistant Examiner*—Gregory J. Strimbu
*Attorney, Agent, or Firm*—William S. Frommer; Alvin Sinderbrand

[57] ABSTRACT

A tape cartridge comprises a base plate, a pair of tape reels rotatably supported by a pair of upstanding reel shafts which shafts are supported on the base plate, and a magnetic tape wound on the tape reels wherein a plurality of tape guides are provided to define a tape travel path. The base plate is formed with an aluminum-alloy plate with a hard protective film on both faces of the aluminum-alloy plate and small impressions in the hard protective film for elimination of residual strain. The hard protective film is formed by an anodic oxidation coating. In order to eliminate residual stress or strain existing in the base plate formed by a punching operation, each of the small impressions is formed by impressing the hard protective film to a depth within a thickness of the hard protective film or to a depth within a permissible limit of deformation (elongation) of the hard protective film.

5 Claims, 6 Drawing Sheets

BASE PLATE ASSEMBLY FOR TAPE CASSETTE FOR INCREASING CORROSION RESISTANCE

BACKGROUND OF THE INVENTION

1. Field of the Invention

The present invention relates to a tape cartridge suitable for use in external data storage media for computers, and specifically to techniques optimally applicable to produce a high-precision base plate for a ¼" data cartridge with ¼ in. magnetic tape, for example.

2. Description of the Prior Art

On the one hand, a magnetic tape employed in a tape cartridge has a relatively large data storage capacity, but, on the other hand, the magnetic tape has comparatively less access as compared with disk-type storage media such as a microfloppy disk. Thus, the data cartridge with magnetic tape is particularly useful as external backup storage media for computers. Referring now to FIGS. 7 to 8, there is shown a typical magnetic tape cartridge (¼" data cartridge) which is optimally applicable to external data storage media for computers. FIG. 7 is an disassembled perspective view illustrating the magnetic tape cartridge 101 (¼" data cartridge). The tape cartridge 101 includes a base plate 102, first and second upstanding reel shafts 103 and 104 firmly mounted on the base plate 102, first and second tape reels 105 and 106 respectively supported rotatably by the first and second reel shafts 103 and 104, first and second upstanding tape guide pins 107 and 108 both firmly disposed on the base plate 102, and a magnetic tape 109 which is wound on the pair of reels 105 and 106 through the plural tape guide pins, first, second and third upstanding roller shafts 111, 112 and 113 firmly disposed on the base plate 102, first, second and third rollers 114, 115 and 116 respectively supported rotatably on the first, second and third shafts 111, 112 and 113, and a flexible and endless drive belt 117 which is wound on the three roller shafts 111, 112 and 113 such that a portion of the drive belt between the roller 114 and the roller 115 pressingly contacts a portion of the outermost peripheral surface of magnetic tape 109 wound on the first reel 105, while a portion of the drive belt between the roller 114 and the roller 116 pressingly contacts a portion of the outermost peripheral surface of magnetic tape wound on the second reel 106, so as to turn the reel pair 105 and 106 when the belt 117 is driven via the roller 114. The roller 114 is usually driven by a drive roller of a tape drive device (not shown). Also provided on the base plate 102 is a reflection mirror 118 which detects a kind of magnetic tape 109 and each tape end. The reflection mirror 118 is conventionally designed to reflect detection light beam emitted from a light source (not shown) and to direct light beam, reflected from the mirror, to the magnetic tape. As seen in FIG. 7, to form a casing of the tape cartridge 101, an upper half 121 (a substantially rectangular cover), usually formed of electrically insulating synthetic resin, is assembled on the base plate (the lower half) by means of a plurality of screws 122 in such a manner as to hermetically cover the first and second reels 105 and 106 and the tape 109. The upper half 121 has a head insertion space (or a tape exposure section) 121a at its front face so that some of the magnetic tape is exposed therethrough to the outside of the cartridge casing. The head insertion space is provided within the straight tape travel path between the two ranged guide pins 107 and 108. As may be appreciated from FIG. 7, the head insertion space 121a is opened and closed by way of a cover 124 which is pivotally supported by an upstanding pin (not numbered and provided on the base plate 102) and normally biased in a closed position by means of a return spring 123. The previously-noted drive belt 117 is usually made of elastic material such as urethane rubber. The flexible endless drive belt 117 is wound on the first, second third rollers 114, 115 and 116 with a predetermined tension. These rollers 114, 115 and 116 must be installed on the respective roller shafts 111, 112 and 113 in such a manner that a perpendicularity of each roller shaft is held within an allowable range irrespective of the tension of the drive belt. Additionally, the reflection mirror 118 must be installed on the base plate 102 with a high accuracy in order to be able to precisely reflect detection beam emitted from the light source onto a predetermined point on the magnetic tape 109. Moreover, the base plate 102 of the cartridge requires a high rust-proofing performance, because there is a possibility of imperfect recording and/or reproduction (so-called dropout error) if the rust on the base plate adheres to the coated (recording) surface of the tape 109. In order to satisfy the previously-described requirements (a base plate of a data cartridge having both a high precision and a high rigidity), the base plate 102 is conventionally formed of aluminum alloy plate or aluminum-alloy material 131 (of 2 to 3 mm in thickness) with a pair of opposing hard protective coatings or films 132 on both faces and a great number of small impressions 133 formed or impressed on each face of the base plate with the hard protective coatings for the purpose of eliminating residual stress or strain existing in a punched base plate material (an incomplete base plate) and of ensuring a high flatness of the base plate. The hard protective coating 132 is formed by making anodic oxidation treatment, called alumite treatment, on both faces of a sheet of aluminum alloy or a roll of aluminum alloy. On the other hand, a plurality of small impressions 133 are formed on both surfaces of the base plate by pressing concavities onto the hard protective coating 132 of the punched base plate. The prior art tape cartridge (particularly the base plate 102 used as the lower half of the cartridge) suffers from the following drawbacks.

(1) As best seen in FIG. 8, when small impressions 133 are pressed on both faces of the base plate 102 through the respective hard anodic oxidation films (hard protective films) 132 with which the respective faces of the aluminum-alloy plate 131 are coated, edges and corners indicated by reference numerals 133a are formed on the hard anodic oxidation coating, and simultaneously edges 131a and corners 131b are formed on the aluminum-alloy plate 131. As is generally known, there is a tendency of stress concentration at the above-noted edges and corners indicated by reference signs 133a, 131a and 131b. Such stress concentration could often produce local breakage of the hard protective film 132. Due to the local breakage, there is a possibility that the aluminum-alloy plate 131 of the base plate 102 is locally exposed to atmosphere. The aluminum-alloy plate 131 itself tends to gather rust easily. Assuming that the rust formed at each locally cracked section 133a adheres to the magnetic-tape coated surface, there is a possibility that the rust causes a so-called dropout during which a signal is lost. The magnetic tape cartridge product with rust looks poor.

(2) As a method for preventing breakage of the hard protective coating (the hard anodic oxidation film) 132 in a process in which small impressions 133 (for elimination of residual strain) are formed or transferred on the base plate by way of press working, small impressions 133 may be pre-formed on the aluminum-alloy plate of the base plate 102 for firstly eliminating residual strain existing in the punched aluminum-alloy plate, and thereafter hard protective coating 132 may be applied to the punched aluminum-alloy plate with small impressions 133. However, such a method cannot be applied to a particular case in which a so-called pre-alumite material or a so-called pre-coating material (synthetic-resin precoated aluminum material) is used for production of a base plate of a data cartridge. The previously-noted pre-alumite material or pre-coating material means such a particular material that a hard protective coating or film is formed by performing an alumite treatment or a coating treatment in the stage of a sheet of aluminum alloy or a roll of aluminum alloy (not yet punched as a base plate of a predetermined shape and dimensions). In the event that a base plate is produced by punching pre-alumite material or precoating material, since a hard protective coating has already been formed on each face of the base plate. This eliminates the need for a conventional process that a plurality of base plates are first produced by punching an aluminum-alloy plate material and thereafter a hard protective coating is made to respective base plate punched. For the reasons set out above, in recent years, one skilled in the art pays attention to a method for manufacturing a base plate employed in a data cartridge from a pre-alumite material or a pre-coating material as a new manufacturing method.

SUMMARY OF THE INVENTION

Accordingly, it is an object of the present invention to provide an improved tape cartridge which avoids the foregoing disadvantages of the prior art.

It is another object of the invention to provide a tape cartridge with a base plate of a high precision and a high rigidity, in which small impressions can be effectively formed on the base plate without producing any breakage or crack, for the purpose of eliminating residual stress in the base plate and of ensuring a high flatness of the base plate.

In order to accomplish the aforementioned and other objects of the invention, a tape cartridge comprises a base plate, a pair of upstanding reel shafts firmly provided on the base plate, a pair of tape reels rotatably supported by the upstanding reel shafts respectively, a plurality of tape guides provided on the base plate, a magnetic tape wound on the pair of tape reels so that a tape travel path of the magnetic tape is defined by the tape guides, and the base plate being formed with an aluminum-alloy plate with a hard protective film on both faces and small impressions for elimination of residual strain, wherein the hard protective film is formed by an anodic oxidation coating, and wherein each of the small impressions for elimination of residual strain is formed by impressing the hard protective film within a thickness of the hard protective film.

According to another aspect of the invention, a tape cartridge comprises a base plate, a pair of upstanding reel shafts firmly provided on the base plate, a pair of tape reels rotatably supported by the upstanding reel shafts respectively, a plurality of tape guides provided on the base plate, a magnetic tape wound on the pair of tape reels so that a tape travel path of the magnetic tape is defined by the tape guides, and the base plate being formed with an aluminum-alloy plate with a hard protective film on both faces and small impressions for elimination of residual strain, wherein the hard protective film is formed by performing a coating treatment to the aluminum-alloy plate, and wherein each of the small impressions for elimination of residual strain is formed by impressing the aluminum-alloy plate from above the hard protective film within a permissible limit of deformation of the hard protective film. It is preferable that the coating treatment may be performed by coating an acrylate-resin coating material or a silicone-resin material on the aluminum-alloy plate.

Each of the small impressions may preferably be formed into an essentially semi-spherical shape.

DESCRIPTION OF THE PREFERRED EMBODIMENTS

Figure 1:
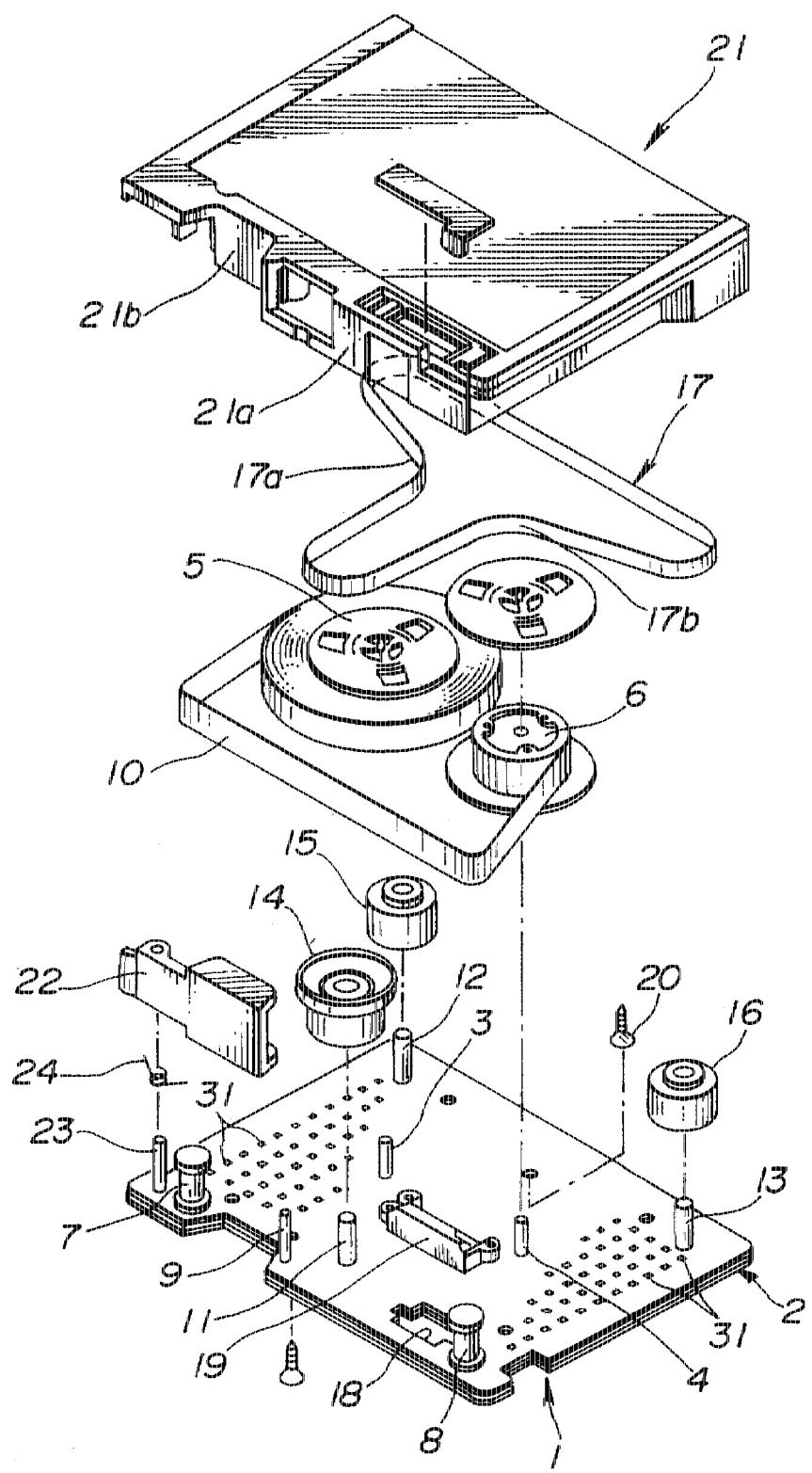
FIG. 1 is a exploded perspective view illustrating a tape cartridge made according to the invention.

Referring now to the drawings, particularly to FIGS. 1 through 6, the tape cartridge 1 of the embodiment includes a base plate 2, first and second upstanding reel shafts 3 and 4 firmly provided on the base plate 2, first and second tape reels 5 and 6 respectively supported rotatably by the first and second reel shafts 3 and 4, a pair of upstanding flanged tape guide pins 7 and 8 and a relatively small-diameter tape guide pin 9 all firmly disposed on the base plate 2, and a magnetic tape 10 whose straight travel path is defined by these guide pins 7, 8 and 9, and which is wound on the pair of reels 5 and 6 through the plural tape guide pins, first, second and third upstanding roller shafts 11, 12 and 13 firmly disposed on the base plate 2, first, second and third belt rollers 14, 15 and 16 respectively supported rotatably on the first, second and third roller shafts 11, 12 and 13, a flexible and endless drive belt 17 which is wound on the belt rollers 14, 15 and 16 rotatably supported to respective roller shafts 11, 12 and 13 such that a portion 17a of the drive belt between the roller 14 (serving as a driven roller) and the roller 15 (serving as an idle roller) pressingly contacts a portion of the outermost peripheral surface of magnetic tape 10 wound on the first reel 5 while a portion 17b of the drive belt between the roller 14 and the roller 16 (serving as an idle roller) pressingly contacts a portion of the outermost peripheral surface of magnetic tape wound on the second reel 6 so as to turn the reel pair 5 and 6 when the belt 17 is driven via the roller 14, a reflection mirror 19 provided on the base plate 2 and facing a substantially rectangular cut-out 18 formed in the base plate for detecting each tape end, and an upper half 21 (a substantially rectangular cover), usually formed of electrically insulating synthetic resin, is installed on the base plate 2 (the lower half) by means of a plurality of screws 20 in such a manner as to hermetically cover the first and second tape reels 5 and 6, the ranged tape guides 7 and 8, and the tape guide pin 9 and the magnetic tape 10 to form a casing of the tape cartridge in conjunction with the lower half. The upper half 21 has a head insertion space (or a tape exposure section) 21b at its front face 21a so that some of the magnetic tape is exposed therethrough to the outside of the cartridge casing. The head insertion space 21b is provided within the straight tape travel path between the two flanged guides 7 and 8. The head insertion space 21b can be opened and closed by way of a cover 22. The cover 22 is pivotally supported by an upstanding pin 23 which pin is provided on the base plate, and normally biased in a closed position by means of the bias of a return spring 24.

Figure 2:
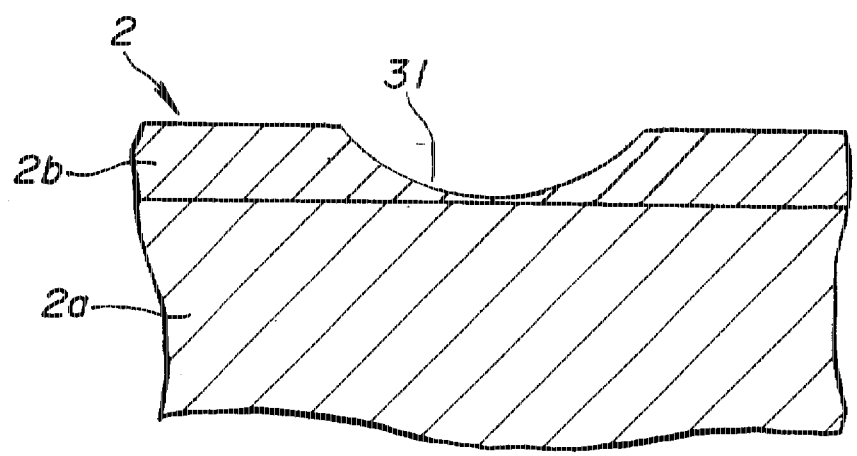
FIG. 2 is an enlarged cross-sectional view illustrating an essential part of the base plate employed in the tape cartridge shown in FIG. 1.
Figure 3:
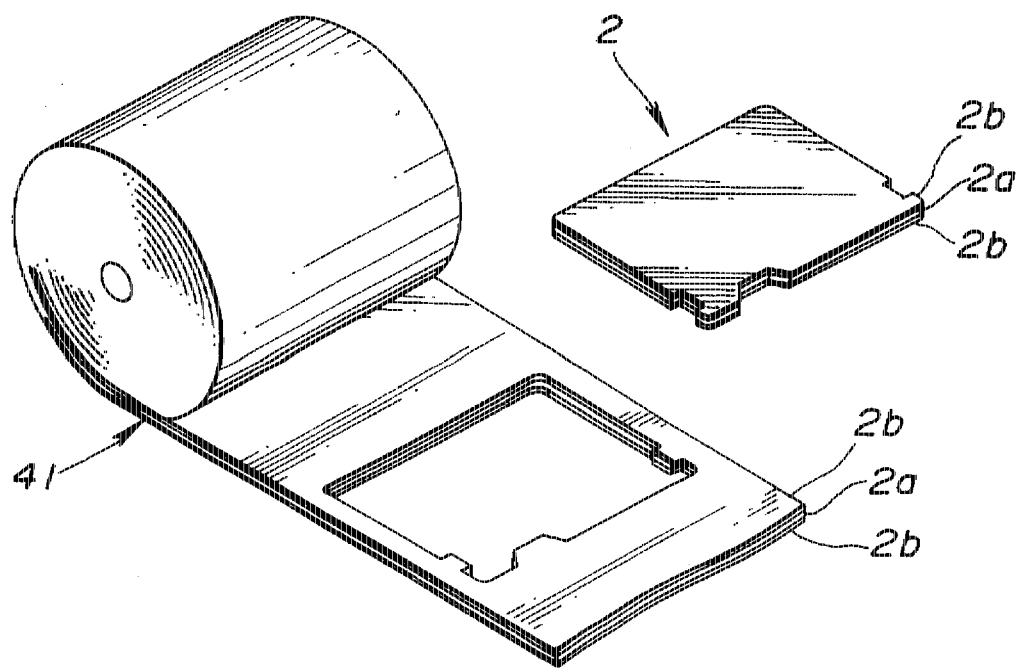
FIG. 3 is a perspective view illustrating a roll of pre-alumite material used as a material for producing a base plate and the incomplete base plate just after punching.
Figure 4:
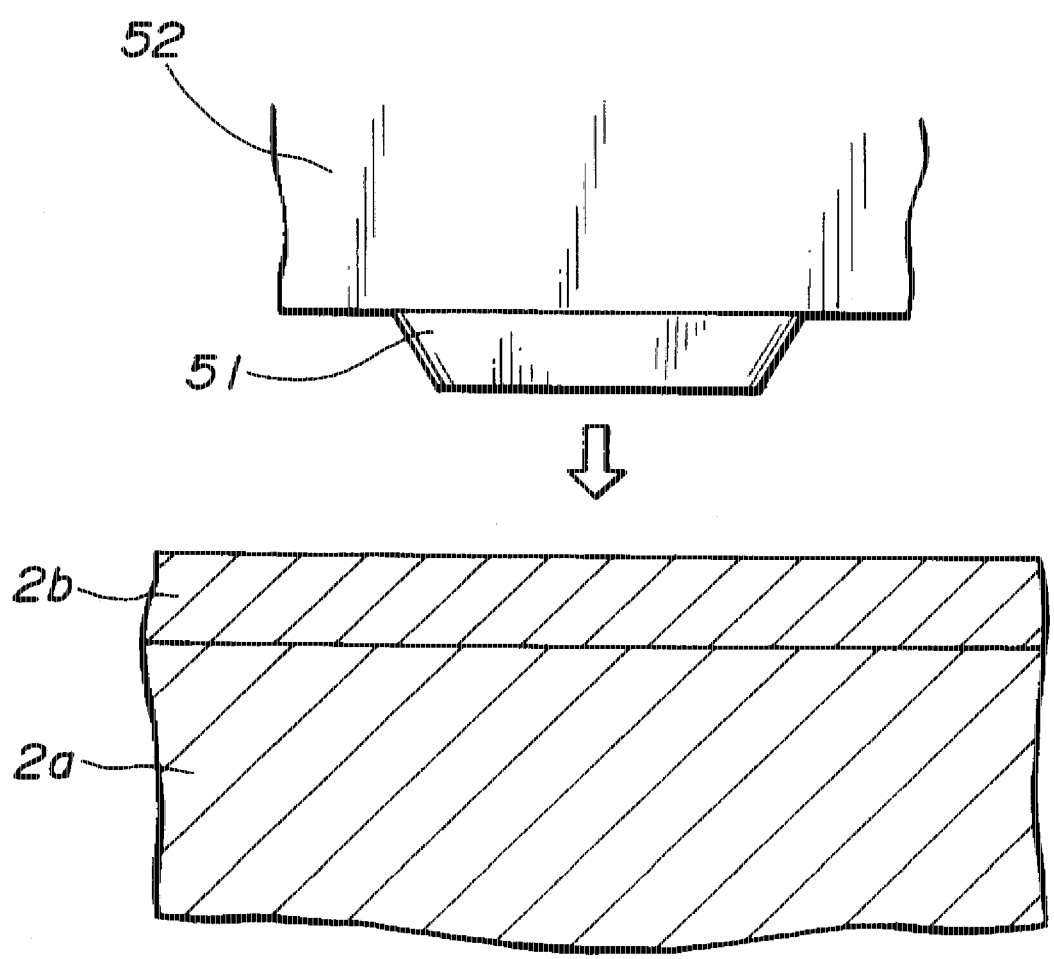
FIG. 4 is an enlarged cross-sectional view showing a pressing process for forming small impressions on the base plate.

As shown in FIG. 2, the previously-noted base plate 2 has a hard protective coating 2b on each surface of the aluminum-alloy plate 2a of 2 to 3 mm in thickness and a large number of small impressions 31 formed on the hard protective coating 2b for the purpose of eliminating residual stress or strain existing in the base plate punched. In the embodiment shown in FIGS. 2 to 4, the hard protective coating 2b is formed by performing anodic oxidation to the aluminum-alloy plate 2a and thus forming anodic oxidation coating or film on both surfaces of the plate 2a. The hard protective coating 2b (the hard anodic oxidation film) is generally formed as a layer or film of a thickness of approximately 9 µm. In the case of the base plate 2 employed in the data cartridge 1 of the embodiment, small impressions 31 are produced by impressing the hard protective coating 2b with press dies formed on a transfer roller and thus forming concavities each having a depth of 5 to 8 µm. As seen in FIG. 3, the above-mentioned base plate 2 is produced by a punching step in which a roll of aluminum alloy 41 (or a long sheet of aluminum alloy) is punched into a plurality of base plates each having a predetermined shape and dimensions, which aluminum alloy roll 41 is produced by forming a hard protective film 2b consisting of an anodic oxidation coating on each of upper and lower surfaces of the aluminum alloy material 2a through anodic oxidation treatment, and by a pressing work performed after the punching step for forming small impressions 31 on the hard protective coating 2b and consequently for eliminating undesired residual strain in the base plate punched. As appreciated from FIG. 4, in case of the above-mentioned pressing work, a transfer roller 52, which roller is formed with a plurality of press dies 51 each being usually prismoidal in shape, is often used. The plural small impressions 31 are formed by impressing the hard protective coating 2b with the prismoidal press dies 51, thus eliminating residual strain or internal stress existing in the base plate 2. If there are some projected or raised portions on the hard anodic oxidation film coated surface of the base plate after forming the plural small impressions 31, for the purpose of removing such raised portions the surface of the base plate may be properly ground or polished if it is required. In the case of the base plate 2 discussed by reference to FIGS. 2 to 4, note that the small impressions 31 are formed on the hard protective coating 2b such that the depth of each small impression 31 becomes within the thickness (approximately 9 µm) of the hard protective coating 2b. This can effectively prevent the aluminum alloy plate 2a from being exposed to atmosphere, and thus preventing generation of rust on the base plate. In the case of the base plate 2 made according to the present invention, each small impression 31 is formed into a designated depth of 8 µm or less with respect to the hard protective coating 2b having the thickness of 9 µm, and as a result there is no occurrence of rust (aluminum chloride) formed on the base plate 2 even when the base plate with small impressions 31 of 8 µm or less in depth is immersed into salt water. Hitherto, each small impression of a base plate would be formed into a comparatively great depth of 14 µm with respect to a hard protective coating having a thickness of 9 µm, and rust consisting of aluminum chloride could be formed on both surfaces of the base plate through immersion of the base plate with small impressions of 14 µm in depth into salt water. These test results were experimentally confirmed by the inventors of this invention.

Figure 5:
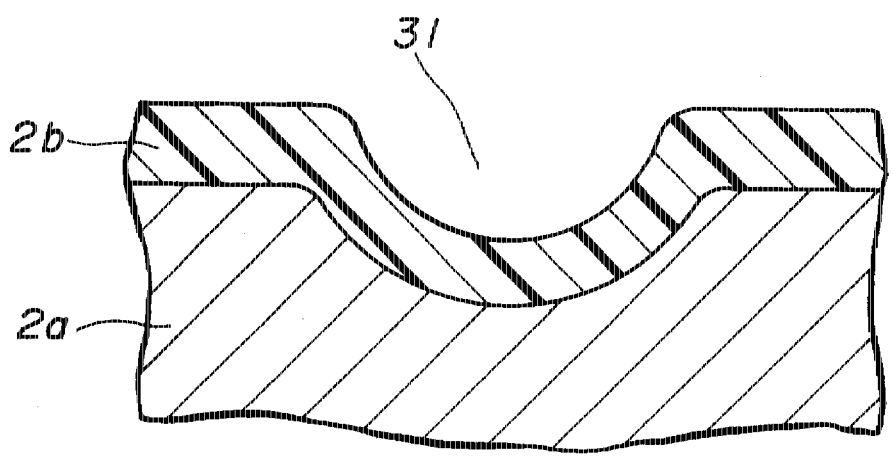
FIG. 5 is an enlarged cross-sectional view illustrating an impressed portion of a further embodiment of a base plate employed in the tape cartridge of the present invention.
Figure 6:
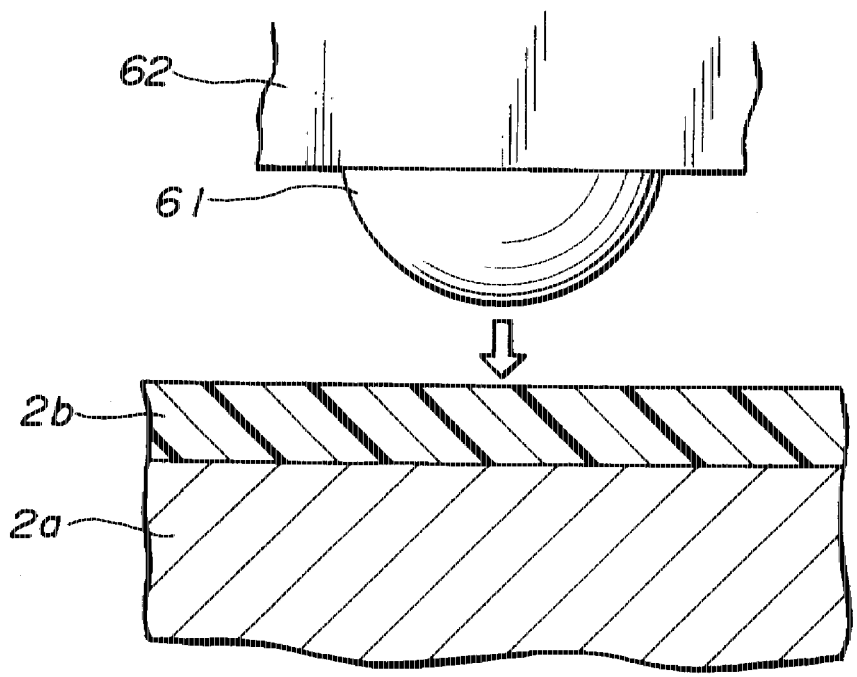
FIG. 6 is an enlarged cross-sectional view showing a pressing process for forming small impressions of the modification.
Figure 7:
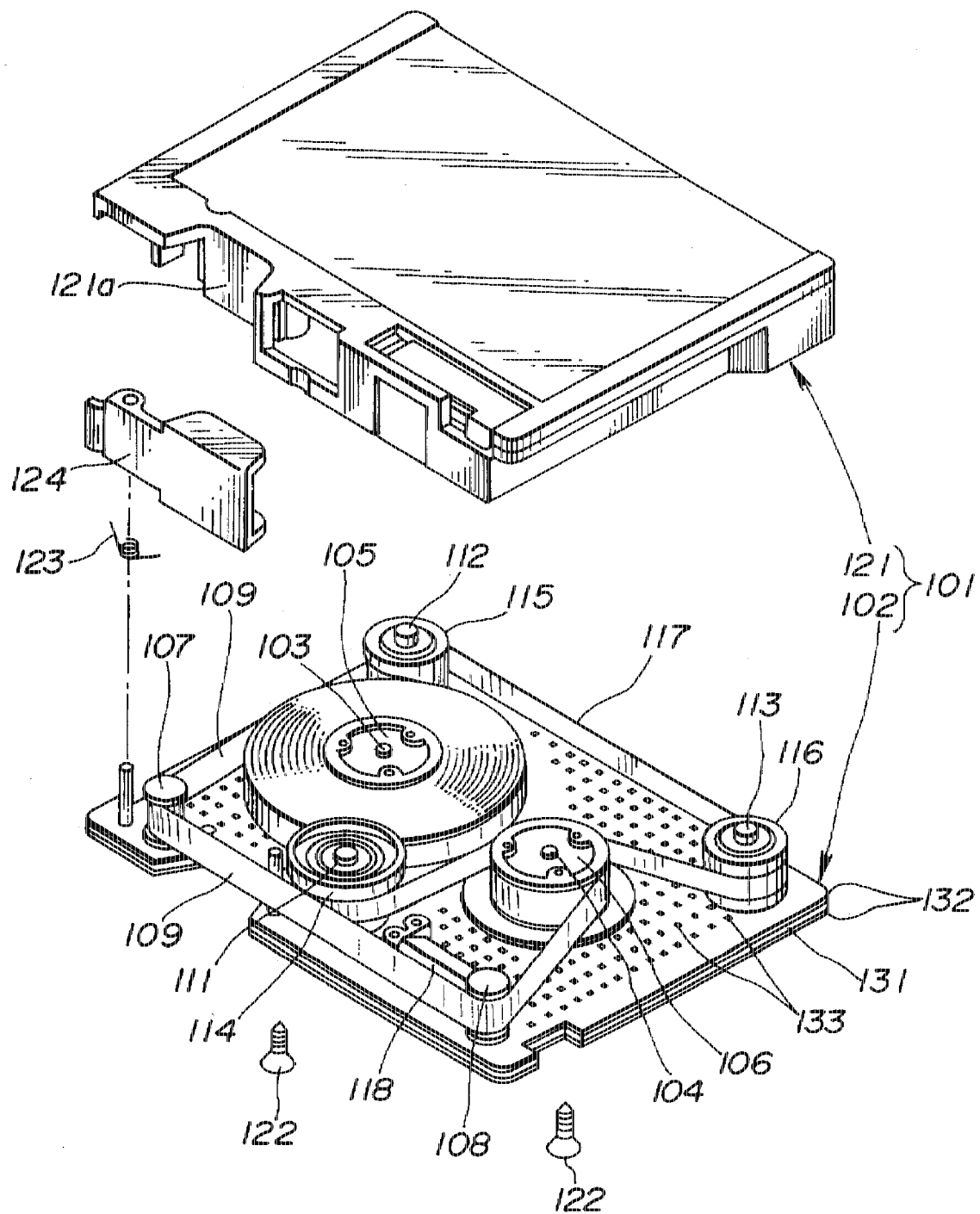
FIG. 7 is a dis-assembled perspective view illustrating a prior art tape cartridge.
Figure 8:
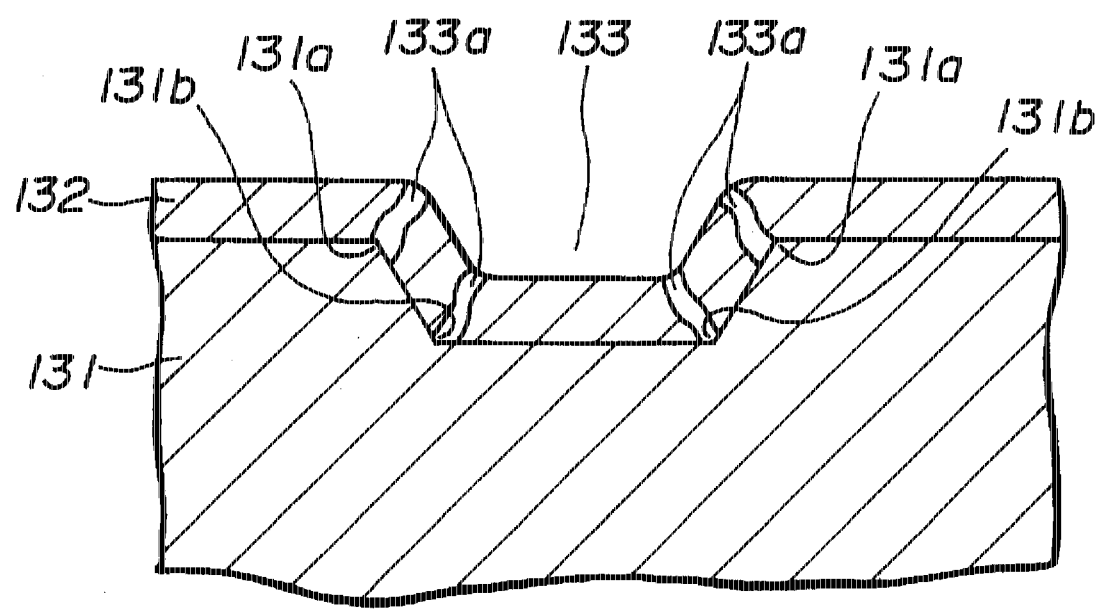
FIG. 8 is an enlarged cross-sectional view illustrating one small impression as formed on the prior art base plate as shown in FIG. 7 and specifically illustrating the problem of stress-concentration at edges and corners of each small impression.

Referring now to FIGS. 5 and 6, there is shown a modification of a base plate with a hard protective film 2b consisting of synthetic resin. The synthetic-resin coated hard protective film 2b is formed on the aluminum alloy plate 2a by way of a coating treatment. The previously-noted hard protective film 2b of 9 µm in thickness is formed by coating an acrylate-resin coating material or a silicone-resin coating material on the aluminum-alloy plate 2a by way of roll coating or the like. Also, small impressions 31 are produced by forming concavities each having a depth of 5 to 12 µm by way of press working from above the synthetic-resin coated hard protective film 2b. Note that the maximum possible depth of the concavity or the small impression 31 is determined within a permissible limit of deformation (elongation) of the synthetic-resin coated hard protective film 2b. As seen in FIG. 6, for the purpose of press-working for the small impressions 31 on the base plate surface, a pressing tool 62 with a plurality of press dies 61 each being semi-spherical in shape, is used. Such a semi-spherical press die 61 is effective to suppress formation of undesired edges and corners which would induce breakage of the hard protective film 2b, and consequently to effectively prevent the aluminum alloy plate 2a from being exposed directly to atmosphere due to breakage of the hard protective film or coating 2b. Thus, the base plate of the modification shown in FIGS. 5 and 6 can provide the same effect as explained in the embodiment shown in FIGS. 2 to 4. It will be appreciated that the previously-noted semi-spherical press die 61 may be used for forming semi-spherical small impressions (see dated line in FIG. 2) on the base plate with a hard protective film 2b consisting of anodic oxidation coating by way of press-working from above the hard protective film 2b, so as to more effectively prevent formation of breakage or crack which will occur at stress-concentration points of each impressed section.

As will be appreciated from the above, in the case of the tape cartridge of the embodiment, a hard protective film is formed on each face of an aluminum-alloy plate by way of hard anodizing for production of a base plate, and then each small impression is formed within a thickness of the hard protective film for elimination of residual stress or strain existing in the base plate. The small impression formed within the thickness of the hard protective film is effective to prevent the aluminum-alloy plate being exposed to atmosphere, thus preventing generation of rust on the base plate. Therefore, it is possible to make use of a so-called pre-alumite material, in which anodic oxidation film is formed on both faces of an aluminum alloy plate, so as to produce an inexpensive base plate. In the case of the tape cartridge of the modification, a hard protective film is formed on each face of an aluminum-alloy plate by way of coating treatment for production of a base plate, and then each small impression is formed within a permissible limit of deformation (elongation) of the hard protective film for the purpose of removing residual strain from the base plate. The small impression formed within the permissible limit of deformation (elongation) of the hard protective film is effective to prevent the aluminum-alloy plate being exposed to atmosphere, thus preventing generation of rust on the base plate. Thus, it is possible to make use of a so-called pre-coating material, in which a hard protective film is formed on both faces of an aluminum alloy plate by way of pre-coating, so as to produce an inexpensive base plate. Additionally, in the case that the respective small impression is formed into a semi-spherical shape, the hard protective film tends to elongate or expand uniformly during press-working, thereby preventing occurrence of local breakage at each semi-spherical small impression.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A tape cartridge comprising:

a base plate;

a pair of upstanding reel shafts supported on said base plate;

a pair of tape reels rotatably supported by said upstanding reel shafts, respectively;

a plurality of tape guides provided on said base plate;

a magnetic tape wound on said pair of tape reels wherein said tape guides define a tape travel path; and said base plate being formed with an aluminum-alloy plate with a hard protective film on both faces of the base plate and small impressions formed on the hard protective film for elimination of residual strain;

wherein said hard protective film is formed by an anodic oxidation coating, and wherein each of said small impressions for elimination of residual strain is formed by impressing said hard protective film to a depth within a thickness of said hard protective film and the hard protective film is not depressed to a further depth by such impression.

2. A tape cartridge as set forth in claim 1, wherein each of said small impressions is formed into an essentially semi-spherical shape.

3. A tape cartridge comprising:

a base plate;

a pair of upstanding reel shafts supported on said base plate;

a pair of tape reels rotatably supported by said upstanding reel shafts, respectively;

a plurality of tape guides provided on said base plate;

a magnetic tape wound on said pair of tape reels wherein said tape guides define a tape travel path; and said base plate being formed with an aluminum-alloy plate with a hard protective film on both faces of the base plate and small impressions formed in a generally semi-spherical shape on the hard protective film for elimination of residual strain;

wherein said hard protective film is formed by performing a coating treatment to said aluminum-alloy plate, and wherein each of said small impressions for elimination of residual strain is formed by impressing said aluminum-alloy plate from above said hard protective film to a concavity with a depth within a permissible limit of deformation of said hard protective film.

4. A tape cartridge as set forth in claim 2, wherein said coating treatment is performed by coating an acrylate-resin coating material on said aluminum-alloy plate.

5. A tape cartridge as set forth in claim 2, wherein said coating treatment is performed by coating a silicone-resin coating material on said aluminum-alloy plate.

* * * * *